April 6, 1965   L. MACARRULLA   3,176,665
ROTARY PISTON INTERNAL COMBUSTION ENGINE
Filed Aug. 2, 1961   4 Sheets-Sheet 1
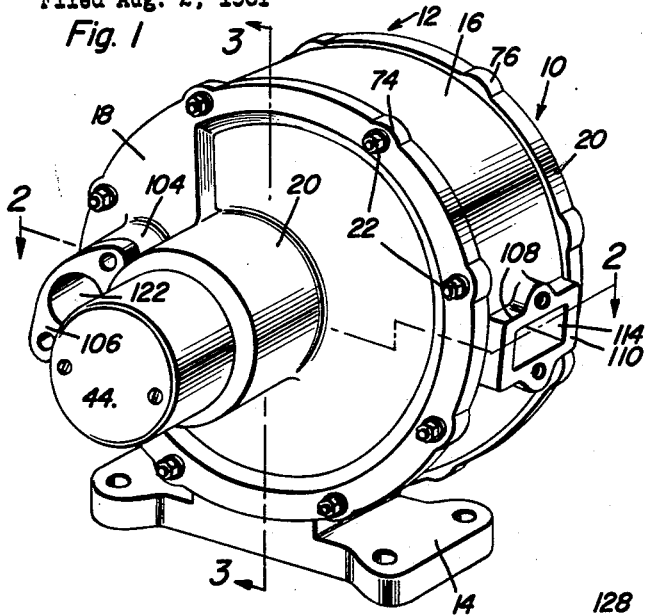
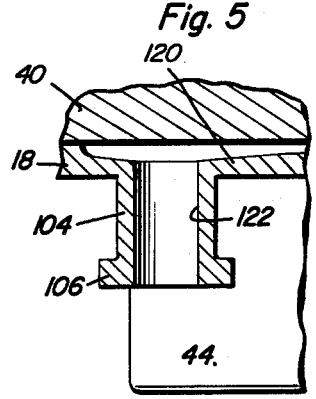
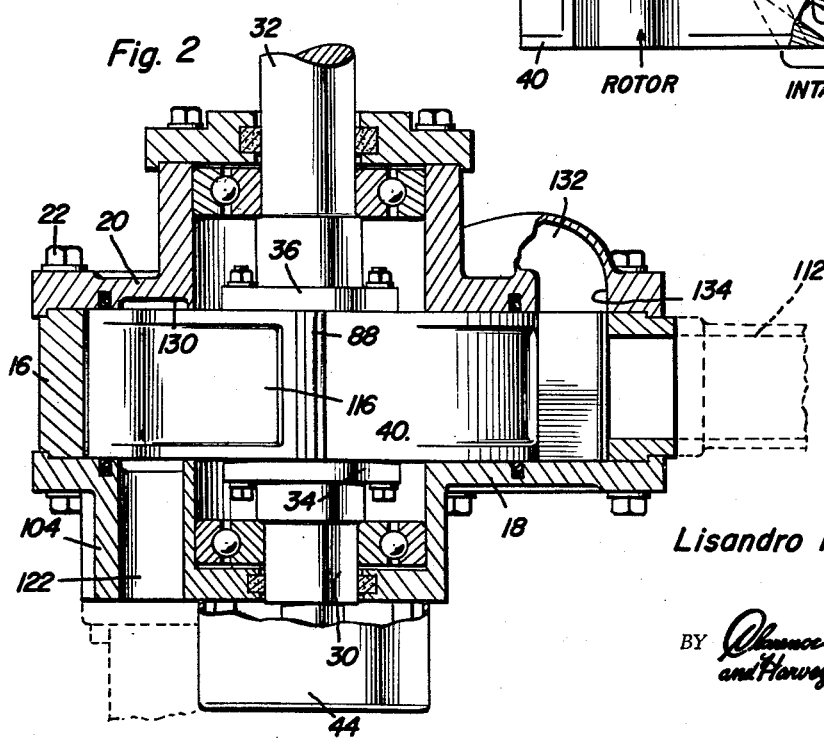
Lisandro Macarrulla
INVENTOR.

April 6, 1965  L. MACARRULLA  3,176,665
ROTARY PISTON INTERNAL COMBUSTION ENGINE
Filed Aug. 2, 1961  4 Sheets-Sheet 2

Lisandro Macarrulla
INVENTOR.

Lisandro Macarrulla
INVENTOR.

April 6, 1965  L. MACARRULLA  3,176,665
ROTARY PISTON INTERNAL COMBUSTION ENGINE
Filed Aug. 2, 1961  4 Sheets-Sheet 4

Lisandro Macarrulla
INVENTOR.

United States Patent Office 3,176,665
Patented Apr. 6, 1965

3,176,665
ROTARY PISTON INTERNAL COMBUSTION ENGINE
Lisandro Macarrulla, 323 W. 80th St., New York 24, N.Y.
Filed Aug. 2, 1961, Ser. No. 128,819
10 Claims. (Cl. 123—16)

This invention comprises a novel and useful rotary piston internal combustion engine and generally relates to an internal combustion engine of the rotary piston type having internal supercharging means.

Although the present application discloses an internal combustion engine of the rotary piston type as an exemplary embodiment of the principles of the invention, it should be understood that some of the principles of the invention are equally applicable to rotary piston machines of other types such as fluid pressure motors, steam engines, fluid pumps and the like. Briefly, the invention relates to a type of machine wherein a stator having a generally cylindrical chamber therein receives a generally cylindrical rotor in the chamber which rotor is journalled for rotation about an axis which is eccentric to the axis of the chamber. The rotor is provided with radially sliding vanes which are continuously engaged with the peripheral wall of the stator so that during rotation of the rotor the space between adjacent vanes constitutes a working chamber which is variable in volume.

It is the primary object of this invention to provide a rotary piston machine and particularly a rotary piston internal combustion engine which shall reduce to a minimum the number of moving parts and the number of components of the machine to provide a device which is capable of extremely long periods of satisfactory operation with a minimum of attention and servicing.

A further object of the invention is to provide an apparatus in accordance with the preceding object which shall be relatively compact and of minimum volume while operating at a very high efficiency both as to thermal efficiency and as to volumetric efficiency.

Yet another object of the invention is to provide an apparatus in accordance with the foregoing objects which will when operating as a pump or motor obtain a very high mechanical advantage in converting the rotation of the rotor into power of a driven shaft.

An additional and very important object of the invention is to provide a rotary piston internal combustion engine in accordance with the preceding objects wherein a pre-compressor is compactly and efficiently built into the structure and confine of the rotor itself to provide an initial pre-compression of the charge of fuel and combustible mixture delivered to the working chamber of the engine.

Yet another object of the invention is to provide an internal combustion engine in accordance with the preceding objects which will substantially reduce if not completely eliminate any possibility of blow-back of the exhausting gases into a preceding working chamber which is receiving combustible mixture therein for compression.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view showing a suitable embodiment of apparatus particularly adapted for use as an internal combustion engine of the rotary piston type, the fuel supply and the exhaust discharge conduits being omitted therefrom;

FIGURE 2 is a view in horizontal section taken upon an enlarged scale substantially upon the plane indicated by broken section line 2—2 of FIGURE 1 and showing the internal construction of the apparatus of FIGURE 1 and with the charge intake and the exhaust discharge conduits being shown in phantom.

FIGURES 5 and 6 are detail views of certain portions of the apparatus;

Designated generally by the numeral 10 in FIGURE 1 is an apparatus incorporating the principles of this invention in the form of an internal combustion engine having a rotary piston. The machine 10 consists of a stator of generally cylindrical configuration indicated by the numeral 12 and which may be provided with any suitable support means such as the mounting bracket 14 thereon.

Figure 3:
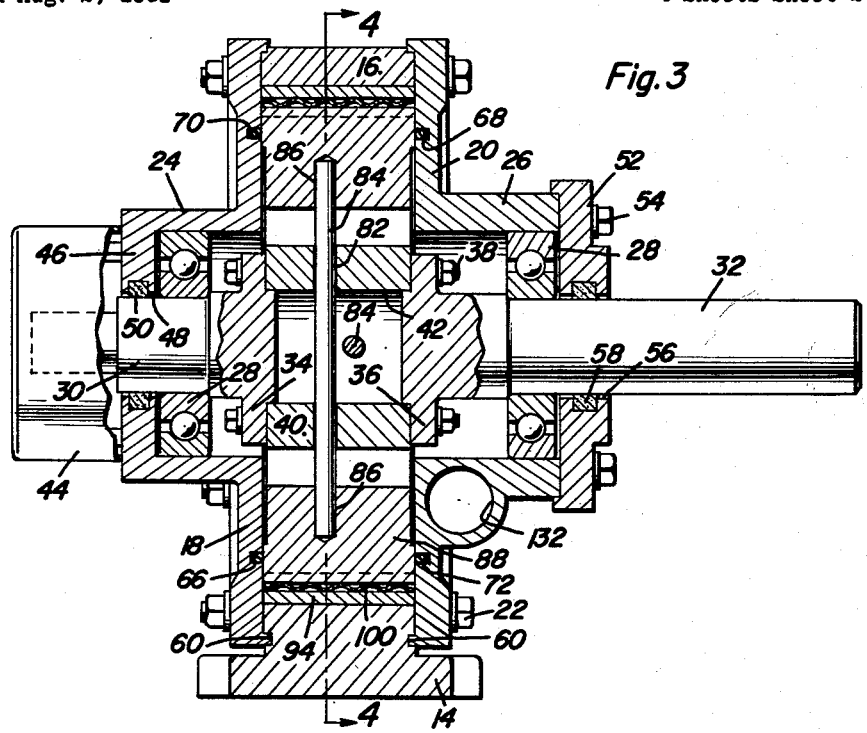
FIGURE 3 is a vertical longitudinal sectional view taken upon an enlarged scale substantially upon the plane indicated by section line 3—3 of FIGURE 1, and showing further internal structural details of the internal construction of the apparatus; parts being shown in elevation and in phantom.
Figure 4:
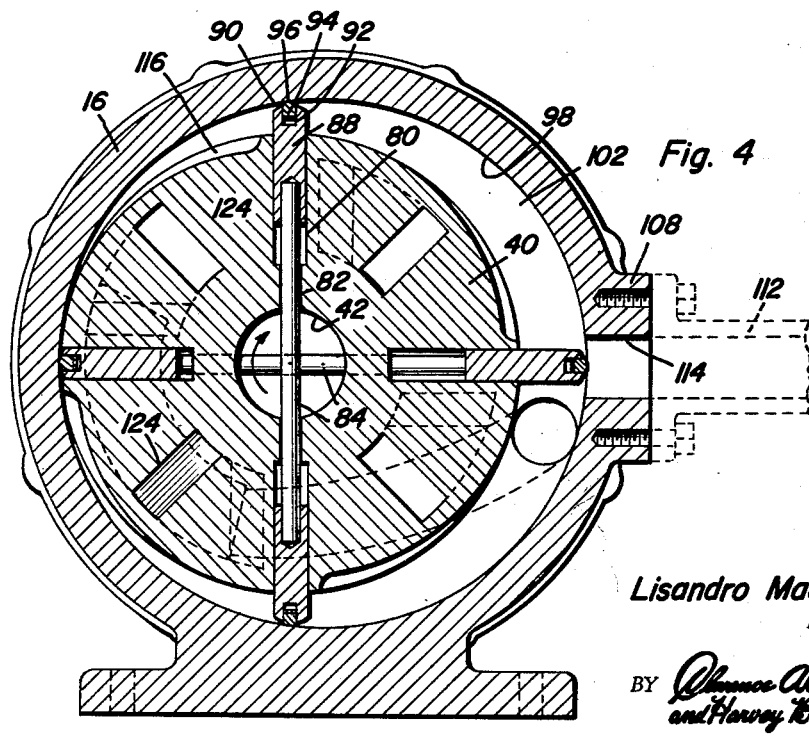
FIGURE 4 is a vertical transverse sectional view taken substantially upon the plane indicated by section line 4—4 of FIGURE 3, parts being shown in phantom and showing further details of the apparatus.
Figure 7:
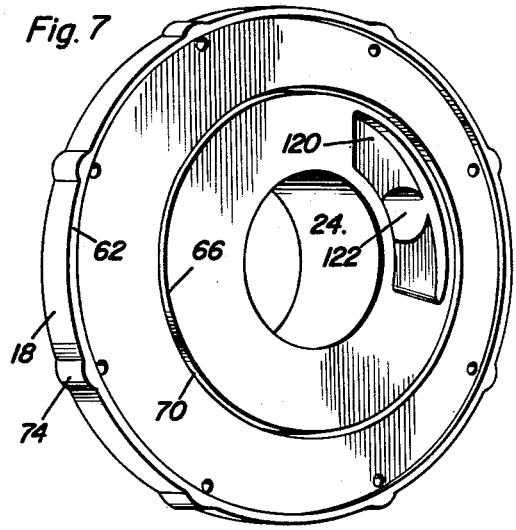
FIGURE 7 is a perspective view of the inside surface of the intake cover plate or end wall of the apparatus.
Figure 8:
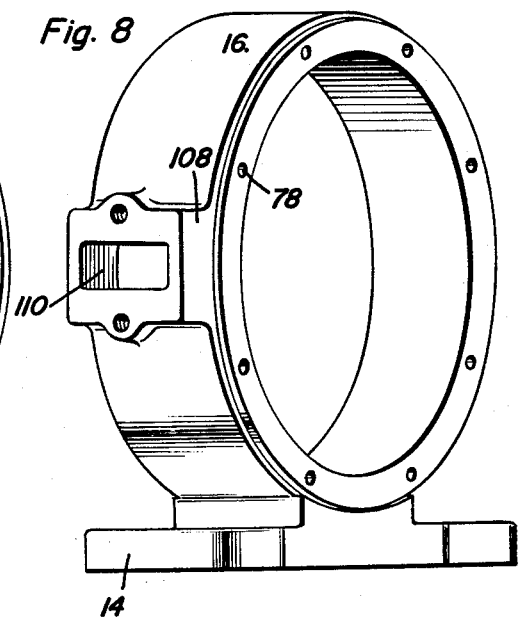
FIGURE 8 is a perspective view of the central component of the stator of the device.
Figure 10:
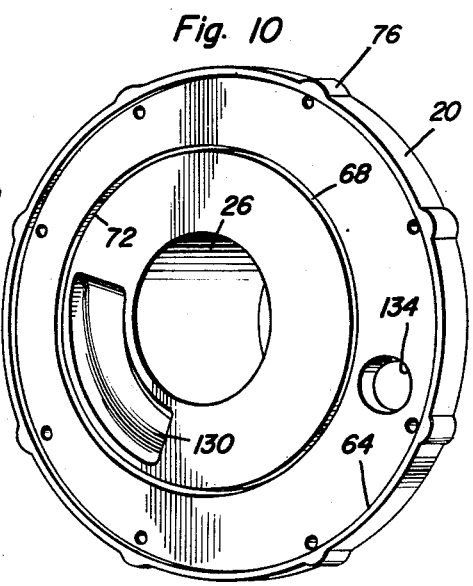
FIGURE 10 is a perspective view of the inside surface of the other closure or end wall of the stator and showing the pre-compression by-pass port therein.

Referring now especially to FIGURES 2–4 it will be observed that the stator 12 consists of a cylindrical casing 16 which element is also shown in FIGURE 8 together with a pair of removable end or closure plates 18 and 20, see also FIGURES 7 and 10 respectively which are removably secured to the casing 16 by means of fastening bolts 22 extending through aligned bores and apertures therein.

As will be best apparent from FIGURES 2 and 3, the cover or end plates 18 and 20 are provided with cylindrical outwardly and axially extending integral projections 24 and 26 in which are journalled as by bearing assemblies 28 a pair of aligned, spaced, oppositely extending shaft sections 30 and 32 respectively. These shaft sections are provided with mounting flanges 34, 36 on each section respectively which through the aid of fasteners such as the bolts 38 are removably secured to the opposite sides of a cylindrical body 40, see FIGURE 9, which comprises a rotor and the rotary piston of the machine. This rotor has an axial passage 42 therethrough and it will be noted that the flanges 34 and 36 have their central portions projecting slightly into this passage for firm seating engagement upon the rotor. Thus, the two shaft sections are rigidly secured to the rotor for journalling the latter and for rotation therewith. Conveniently, power may be taken off from the engine by means of a suitable connection to the shaft section 32, not shown, while the shaft section 30 may be utilized to drive the various engine accessories (not shown), such as the ignition system, the fuel injection system if the engine is operated upon the diesel cycle, such auxiliary equipment as pumps of various types and the like. Inasmuch as the invention set forth and claimed herein is not dependent upon any particular construction of such accessories and equipment, a further description of the same is deemed to be unnecessary. It will thus be understood that the enclosing casing 44 is intended to include any such accessories or equipment and their driving connections with the shaft section 30.

As will be noted from FIGURES 2 and 3, the projection 24 has an outer closing end wall 46 which may be integral therewith and which is provided with a suitable opening 48 therein provided with the usual fluid tight packing or sealing means 50 through which the shaft 30 extends. The other end plate projection 26, on the other hand, is open at its outer end being provided with a movable closure wall 52 secured thereto as by fastening bolts 54, which closure wall is apertured as at 56 and receives a sealing means 58 therein through which the shaft section 32 extends.

At this point it should be noted that when the device is employed as an internal combustion engine, the shaft section 32 comprises the drive shaft of the engine or the power output shaft therefor. Similarly, if the device is to function as a steam engine, a fluid pressure motor or the like the shaft 32 is the power output shaft. On the other hand, if the device is intended to function as a pump, the shaft 32 may comprise the means by which power is applied to cause operation of the rotor and thus constitutes the power input shaft of the machine.

As will be seen from a consideration of FIGURES 2, 3 and 8, 7 and 10, the casing 16 upon the peripheral portion of its annular surfaces is provided with annular grooves or recesses 60 in which are seated and received in a secure tightly fitting and sealed engagement the annular inwardly projecting ribs 62 of the end cover plate 18 and 64 of the end cover plate 20. Further, the adjacent or inner annular faces of the cover plates are provided with annular grooves 66 and 68 therein in which are received annular sealing rings 70 and 72 respectively. These rings establish a fluid tight seal with the rotating surfaces of the rotor 40 in a manner which will be readily apparent.

Conveniently, the cover plates 24 and 26 are provided with apertured bosses 74 and 76 thereon which are aligned with corresponding bores 78 in the casing 16 for reception of the fastening bolts 22 by which the three components of the stator are detachably secured together.

Figure 9:
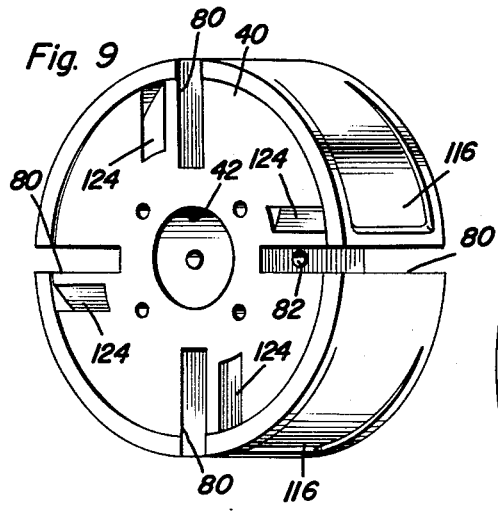
FIGURE 9 is a perspective view of the rotor with its vanes removed therefrom.

Reference is made next to FIGURES 3 and 4 in particular and with further reference to FIGURE 9 for a more detailed consideration of the structure of the rotor and the association of the sealing blades or vanes therewith. Thus, diametrically disposed pairs of radial slots 80 are provided in the rotor which extend from the circumference thereof inwardly toward the hollow passage or center 42. However, these slots terminate inwardly of and spaced from this passage and radially extending bores 82 establish communication between each slot and the rotor central passage 42. The bores 82 are diametrically aligned with each other in order to slidably receive therethrough rods 84. These rods are each slidably received at their opposite ends in corresponding bores 86 which are provided in the piston vanes or blades 88 which are slidably received in the slots 80. At their outer extremities, each of these vanes or blades 88 has an arcuately shaped edge 90 in which is received a slot 92 having a sealing or packing element 94 therein whose outer extremity is likewise rounded as at 96 for continuous rubbing contact with the adjacent inner peripheral surface 98 of the stator casing 16. As will be observed, particularly in FIGURE 3, the vanes 88 extend entirely across the axial extent of the rotor and engage the annular surfaces of the two adjacent end or cover plates 18 and 20. Further, they rub upon the sealing rings 70 and 72 during the rotation of the rotor.

Shown in FIGURE 3 is a resilient corrugated leaf spring 100 disposed in the bottom of the slot 92 in the blades 88 for yieldingly urging the packing members 94 outwardly thereof and against the peripheral wall 98 of the stator.

Obviously, any other desired packing means may be required as necessary, but inasmuch as the invention claimed herein does not depend upon the particular packing means employed for establishing a fluid tight seal between the rotor and the stator, a further description of the same is thought to be unnecessary.

It will be noted from a consideration of FIGURES 3 and 4 that the diametrically opposed pairs of vanes or blades 88 have a single rod 84 extending therebetween, this rod extending through the central passage 42 in the rotor 40. The different rods 84 are disposed in longitudinally spaced arrangement so as to provide a clearance therebetween as clearly shown in FIGURE 3. By this construction, the rods may freely move within the bores 82, while the vanes 88 may move upon the rods as necessary. In operation, centrifugal force will maintain the vanes in fluid tight sealing engagement with the wall 98 of the stator casing, and the packing springs 100 will assist in this operation. Since the peripheral wall 98 of the stator casing 16 is generally cylindrical, there will be a continuous engagement of the pairs of opposed blades or vanes against this wall during rotation of the rotor, so that the over-all length of the rods 84 and the two associated blades and their packing means on each of the rods is relatively fixed in length there being only minor sliding movement between these parts. However, as the rotor turns it will be evident that the working chambers defined within the annular compartment or recess 102 within the stator casing 16, the peripheral surface of the rotor 40 and pairs of adjacent vanes will vary in volume during rotation of the rotor about its eccentrically disposed axis of rotation. As a result of the continuously varying volume of the working chambers, the different cycles of operation of the machine are effected, and in the case of an internal combustion engine, the four successive operating strokes of intake, compression, expansion or firing on the power stroke and the exhausting stroke are obtained.

As will be seen from FIGURE 1 in particular, the stator end plate 18 is provided with a tubular boss 104 having a flanged extremity 106, while the stator casing 16 is provided with an outwardly projecting frame-like boss 108 provided with a mounting flange 110. The boss and flange 104, 106 comprise a part of the fluid inlet means for the machine and by means of which a conventional carburetor or other source of combustible mixture, not shown, is connected thereto for supplying and introducing a combustible mixture into the machine. Similarly, the boss and flange 108, 110 comprises a mounting means by which exhaust gases discharge from the engine may be delivered to an exhaust manifold or exhaust conduit system, as suggested in dotted lines at 112 in FIGURE 4. The exhaust port of the engine is thus shown by the passage 114 which is formed in the boss 108. It will be noted from FIGURE 4 that the piston vanes or blades 88 in turn pass across this port during the rotation of the rotor and thus serve to open the successive working chambers which lie between successive vanes 88 to the exhaust port in cyclic operation.

The periphery of the rotor in each of the working chambers, that is, between each successive pair of the vanes or blades 88 is provided with a shallow recess 116 which extends circumferentially of the rotor and is of gradually tapering depth as shown on FIGURE 4. Inasmuch as the surface of the rotor substantially rubs against the surface 98 of the recess or compartment 102 at the closest position of the rotor thereto, as in the left hand position shown in FIGURE 4, the recesses 116 serve to provide additional clearance into which the charge may be compressed during this rotation of the rotor and during the reduction of volume of the working chambers thereof. Further, the configuration of this recess will assist in producing turbulence in the charge during the compressing of the latter and will also facilitate the forming of a pocket in which the initiation of combustion may occur by the igniting device which may extend through the casing 16 at a predetermined portion of the rotation of the rotor as set forth hereinafter. Inasmuch as the particular type of ignition system employed is immaterial to the invention set forth and claimed herein, and since various ignition systems such as compression ignition, electrical ignition system, flame igniters and the like may be provided, a further illustration and description of the same is deemed to be unnecessary.

Reference is next made particularly to FIGURES 5 and 7 where it will be seen that the inner annular surface of the end or cover plate 18 is provided with an arcuately extending recess 120 therein which recess extends onto both sides of the inlet port 122, the latter being formed in the previously mentioned fluid inlet boss 104. The recess has a generally flat bottom wall and is of tapering depth varying from a minimum depth at its opposite extremities to a maximum depth adjacent the port 122. The port 122 and its recess 120 are disposed radially inwardly of the periphery of the rotor so that the port and recess are adapted to periodically register with the bypass passage inlet ports 124 which are formed in the adjacent annular wall of the rotor, see FIGURES 6 and 9. There is provided one such port 124 for each of the working chambers of the rotor, and these ports will successively register with the inlet port 122 during rotation of the rotor. The ports 124 form the inlet ends of bypass passages 126, see FIGURE 6, which extend through the rotor itself and terminate at the opposite face of the rotor at the end plate 20 in circumferentially spaced bypass passage outlet ports 128. These ports with the passages 126 comprise a pre-compression means disposed within the structure of the rotor itself. The arrangement is such that as the rotor turns, a charge of combustible mixture is introduced into each passage 126 by its corresponding inlet port 124 when the latter is in registration with the inlet port 122 of the cover plate, this charge being impelled both axially and circumferentially of the rotor along the passage 126 to the discharge port 128 thereof during and by rotation of the rotor. Thus, the charge delivered by the carburetor or other source of combustible mixture is given an initial compression by the rotation of the rotor so that it will be delivered from the discharge or exhaust port 128 of the pre-compression means at a pressure substantially above atmospheric. As will be noted from a consideration of FIGURE 6 in conjunction with FIGURE 4, and also from a consideration of the diagrammatic views of FIGURES 11-14, each of the pre-compression passages 126 moves its combustible charge through about 90° of the circumference of the rotor and discharges it into a working chamber thereat. Discharge or transfer of the pre-compressed charge from the pre-compressing means within the rotor into the working chamber is effected through an arcuate extending recess 130 formed in the annular surface of the end cover plate 20 as shown in FIGURE 10, and a duct 132 extends from this recess, as shown in FIGURES 2 and 3, through the end cover plate 20 and by means of a port 134 discharges into the successive working chambers passing such port. The port 134 is disposed closely adjacent to the exhaust port 114. It will thus be apparent that both of the ports 114 and 134 are controlled by the passage of the vanes 88 thereacross. However, the discharge of the precompressed combustible mixture through the outlet port 134 of the pre-compressing means into the working chamber, as shown in FIGURE 4, will introduce the charge at a pressure above that of the exhausting gases from the succeeding working chamber as the latter communicates with the exhaust port 114, the increase in pressure of the incoming charge exceeding the pressure of the outgoing exhaust charge serves to prevent any contamination of the new charge by the exhaust gases.

It will be understood that any desired means may be provided for cooling the engine and for lubricating the same as may be desired. Conveniently, lubrication may be effected in a well known manner by combining lubricant with the fuel mixture. Inasmuch as the lubricating and cooling systems form no part of the invention claimed herein and the latter is not limited to any particular type of such system, a further description is deemed to be unnecessary.

Figure 11:
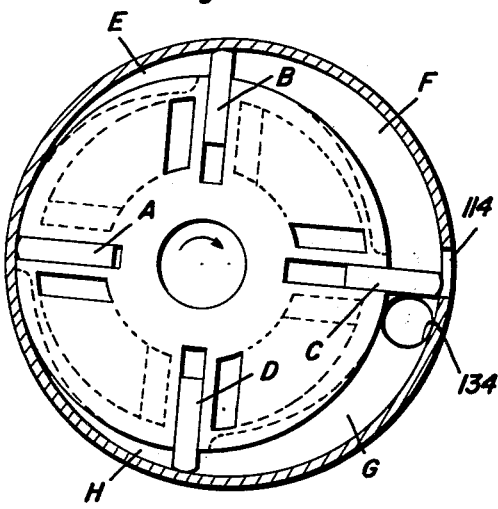
FIGURES 11–14 are successive diagrammatic views showing the positions of the apparatus during a complete cycle of operation.

Attention is now directed to diagrammatic views of FIGURES 11-14 for an understanding of the cycle of operation performed by this engine. In these figures the four vanes or piston blades are shown at A, B, C and D while the working chambers defined thereby are shown at E, F, G and H respectively. Beginning first with the position of the parts as shown in FIGURE 11, it will be observed that the chamber G which has just exhausted through the exhaust port 114 is just receiving a pre-compressed charge from the pre-compressing means through the port 134 while the chamber F, having completed its power or working stroke, is beginning its exhaust through the open exhaust port 114 which has just been uncovered by the vane C. The chamber H is undergoing compression while the chamber E has had the compressed charge ignited and is beginning its expansion or working stroke.

Figure 12:
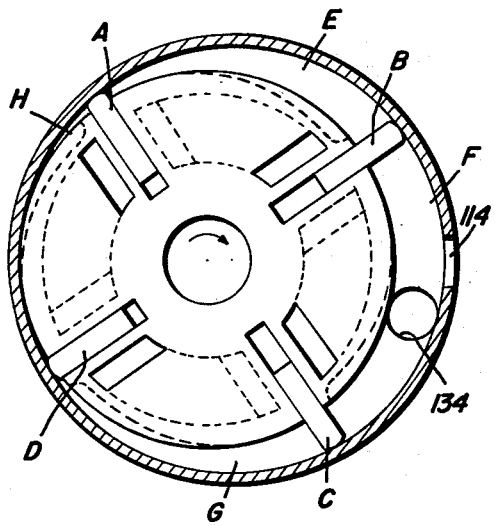

In the next successive position shown in FIGURE 12, it will be seen that a 45° rotation has been effected. At this time, the working chamber F is in the middle of its exhaust stroke, the chamber G which was charged with the pre-compressed combustible mixture is now in the middle of its compression stroke, the chamber H has been compressed and the charge therein ignited, while the chamber E is in the middle of its expansion or working stroke.

Figure 13:
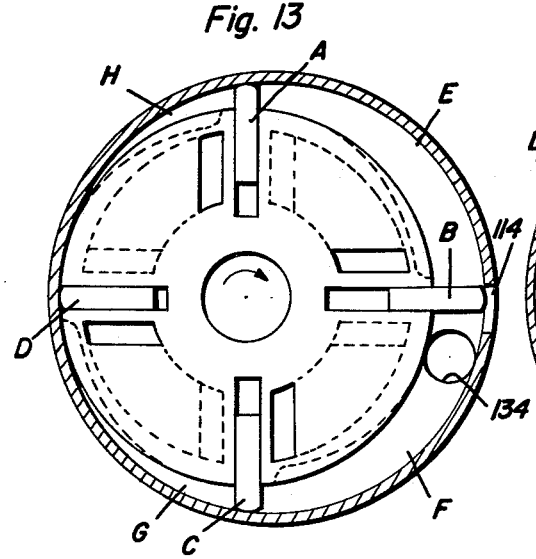

In the position of FIGURE 13, another 45° of rotation has ensued so that the rotor has now completed its first one-quarter of a turn. At this time the vane B is now opening the exhaust port 114 for the discharge of the combustion products from the working chamber E and is just preparing to close the pre-compression intake port 134 into the working chamber F. Thus, the chamber F is about to complete its intake stroke, the chamber E is beginning its exhaust stroke, the chamber G is completing its compression stroke and the chamber H is beginning its working stroke.

Figure 14:
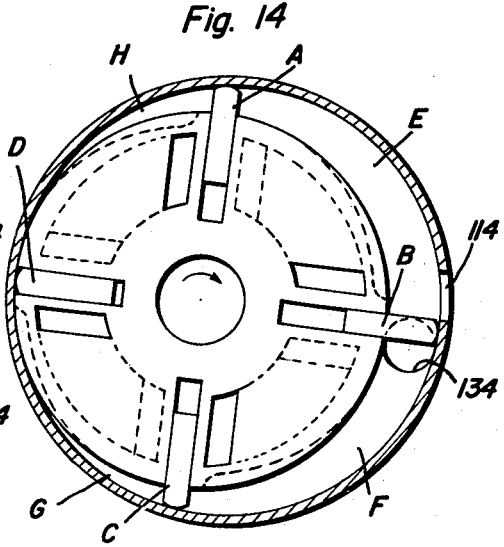

In the position of FIGURE 14, a further rotation has occurred which is sufficient to cause the blade B to now completely uncover the exhaust port 114 and begin to complete its closing of the intake port 134 of the pre-compressed mixture.

It will thus be apparent that with no moving valve parts other than the rotor and the vanes themselves, the engine will perform the four cycles of internal combustion engine of conventional type.

It will be readily understood that with necessary minor adaptations the engine can be caused to operate upon the diesel cycle with fuel being injected for effecting ignition rather than producing by the use of an igniter an ignition of a previously introduced charge, while the fluid inlet port 122 will introduce a charge of air into the working chambers.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A rotary piston machine comprising a stator having a peripheral wall and two end walls defining thereby a central chamber therein, a rotor rotatably journaled in and disposed eccentrically of said chamber, vanes slidably mounted in said rotor and projecting beyond the rotor periphery into continuous sealing engagement with the peripheral wall of said chamber, said vanes, stator and rotor periphery dividing said central chamber into a plurality of circumferentially spaced working chambers successively varying in volume during rotation of said rotor, fluid inlet and exhaust ports in one of said end walls and in said peripheral wall of said stator respectively successively supplying fluid charges into said working chamber and exhausting fluid charges therefrom, fluid precompression means in said rotor comprising helical passages extending axially through said rotor and disposed inwardly of said rotor periphery, one end of each of said helical passages periodically communicating with said fluid inlet port in said stator, an arcuately extending recess in said stator other end wall, the other end of each of said helical passages periodically communicating with said arcuately extending stator recess, said helical passages receiving fluid from said inlet port at one side of said rotor and centrifugally compressing and delivering said received fluid under increased pressure at the other side of said rotor and into said arcuately extending stator recess, bypass means in said stator communicating said arcuately extending stator recess with the inlet port of said working chambers, said inlet port being positioned adjacent but displaced from said exhaust port in the direction of rotor rotation, the leading edge of said arcuately extending stator recess being so positioned as to establish communication with said other end of said helical passages at the same time as one of said vanes reaches the leading edge of said exhaust port and said trailing edge of said arcuately extending stator recess being so positioned as to terminate communication with said other end of one of said helical passages immediately after communication has been established between said recess and said other end of the next succeeding helical passage.

2. The combination of claim 1 wherein the peripheral wall of said central chamber is substantially cylindrical.

3. The combination of claim 1 including aligned stub axles secured to opposite sides of said rotor, each stub axle being journaled in one of said stator end walls.

4. The combination of claim 1 wherein said vanes are disposed in diametrically opposed pairs and are radial of said rotor.

5. The combination of claim 1 wherein said rotor has pairs of diametrically opposed radial slots extending axially of and opening upon the rotor periphery, said slots having each a bottom wall, one vane being slidable in each slot, diametrically extending bores in said rotor, each bore passing through the bottom wall of and establishing communication between a pair of said slots, a rod slidably received in each bore and having its ends engaging vanes in the associated slots whereby to cause reciprocation of the pair of engaged vanes in the same direction.

6. The combination of claim 1 wherein the peripheral wall of said rotor has a plurality of recessed circumferentially extending pockets each disposed in one working chamber and of a progressively decreasing depth from the leading end toward the trailing end of the associated working chamber.

7. The combination of claim 1 wherein said machine constitutes an internal combustion engine and wherein the fluid supplied to said fluid inlet port is a combustible mixture, means located at the point of minimum volume of each working chamber for igniting a combustible mixture in the latter, the fluid discharged from said fluid exhaust port being combustion products.

8. The combination of claim 1 wherein said machine constitutes an internal combustion engine and wherein the fluid supplied to said fluid inlet port is air, a fuel injector located at the point of minimum volume of each working chamber to supply fuel to form a combustible mixture, means to ignite the combustible mixture formed, the fluid discharged from said fluid exhaust port being combustion products.

9. The combination of claim 1 wherein each stator end plate has upon its inner face a circumferentially extending channel, a sealing means received in each channel and having a sealing engagement with the adjacent surface of said rotor.

10. The combination of claim 9 wherein said inner face of each said stator end plate has a laterally projecting marginal circumferentially extending rib, said stator end plate ribs embracing the peripheral exterior surface of said stator peripheral wall.

References Cited in the file of this patent

UNITED STATES PATENTS

| 763,773 | Marlitt | June 28, 1904 |
| 904,974 | Lee | Nov. 24, 1908 |
| 1,282,518 | Althause | Oct. 22, 1918 |
| 2,231,440 | Fess | Feb. 11, 1941 |
| 2,412,949 | Brown et al. | Dec. 24, 1946 |
| 2,437,653 | Rich | Mar. 9, 1948 |

FOREIGN PATENTS

| 570,641 | Canada | Feb. 17, 1959 |
| 769,228 | France | Jan. 5, 1934 |
| 462,013 | Germany | July 4, 1928 |